United States Patent
Lazovich

(10) Patent No.: US 12,169,774 B2
(45) Date of Patent: Dec. 17, 2024

(54) QUANTIZED INPUTS FOR MACHINE LEARNING MODELS

(71) Applicant: Lightmatter, Inc., Boston, MA (US)

(72) Inventor: Tomo Lazovich, Cambridge, MA (US)

(73) Assignee: Lightmatter, Inc., Boston, MA (US)

( * ) Notice: Subject to any disclaimer, the term of this patent is extended or adjusted under 35 U.S.C. 154(b) by 1091 days.

(21) Appl. No.: 17/028,175

(22) Filed: Sep. 22, 2020

(65) Prior Publication Data

US 2021/0089906 A1 Mar. 25, 2021

Related U.S. Application Data

(60) Provisional application No. 62/904,230, filed on Sep. 23, 2019.

(51) Int. Cl.
| | |
|---|---|
| *G06N 3/08* | (2023.01) |
| *G06F 17/18* | (2006.01) |
| *G06F 18/10* | (2023.01) |
| *G06N 20/00* | (2019.01) |
| *G06T 9/00* | (2006.01) |
| *G06V 10/774* | (2022.01) |
| *G06V 10/776* | (2022.01) |

(52) U.S. Cl.
CPC ............... *G06N 3/08* (2013.01); *G06F 17/18* (2013.01); *G06F 18/10* (2023.01); *G06N 20/00* (2019.01); *G06T 9/00* (2013.01); *G06V 10/774* (2022.01); *G06V 10/776* (2022.01)

(58) Field of Classification Search
CPC .......... G06N 3/08; G06N 3/084; G06N 20/00; G06F 17/18; G06F 18/10; G06T 9/00; G06T 7/0002; G06V 10/774; G06K 9/6255; G06K 9/6298; G06K 9/4628; G06K 9/6277

See application file for complete search history.

(56) References Cited

U.S. PATENT DOCUMENTS

| | | | | |
|---|---|---|---|---|
| 2017/0286830 | A1* | 10/2017 | El-Yaniv | G06N 3/045 |
| 2018/0315157 | A1* | 11/2018 | Ould-Ahmed-Vall | ...... |
| | | | | G06N 3/084 |
| 2019/0050710 | A1* | 2/2019 | Wang | G06N 3/063 |
| 2019/0205736 | A1* | 7/2019 | Bleiweiss | G06F 9/3887 |
| 2019/0206090 | A1* | 7/2019 | Ray | G06T 9/002 |
| 2019/0286973 | A1* | 9/2019 | Kovvuri | G06N 3/04 |
| 2020/0193274 | A1* | 6/2020 | Darvish Rouhani | G06N 3/045 |
| 2020/0293456 | A1* | 9/2020 | Ramadoss | G06F 12/1009 |

(Continued)

OTHER PUBLICATIONS

Hubara, Itay, et al. "Quantized neural networks: Training neural networks with low precision weights and activations." The Journal of Machine Learning Research 18.1 (2017): 1-30. (Year: 2017).*

(Continued)

*Primary Examiner* — Randall K. Baldwin
(74) *Attorney, Agent, or Firm* — Wolf, Greenfield & Sacks, P.C.

(57) ABSTRACT

Methods and apparatus for pre-processing first data for use with a trained machine learning model. In some embodiments, the method may comprise accessing the first data, wherein the first data has a first precision; generating, based on at least a first portion of the first data, second data having a second precision lower than the first precision; and providing the second data as input to the trained machine learning model to generate model output.

18 Claims, 9 Drawing Sheets

(56) References Cited

U.S. PATENT DOCUMENTS

| | | | |
|---|---|---|---|
| 2020/0302269 A1* | 9/2020 | Ovtcharov | G06N 3/044 |
| 2020/0302271 A1* | 9/2020 | Ovtcharov | G06N 3/063 |
| 2020/0364552 A1* | 11/2020 | Guo | G06N 3/08 |
| 2021/0019630 A1* | 1/2021 | Yao | G06N 3/045 |
| 2021/0150334 A1* | 5/2021 | Wolfe | G06F 17/14 |
| 2021/0256348 A1* | 8/2021 | Migacz | G06N 3/08 |
| 2021/0264279 A1* | 8/2021 | Esser | G06F 17/16 |
| 2022/0245753 A1* | 8/2022 | Ould-Ahmed-Vall | G06N 3/044 |

OTHER PUBLICATIONS

Chen, Yukang, et al. "Joint neural architecture search and quantization." arXiv preprint arXiv:1811.09426 (2018): 4321-4330 (Year: 2018).*

Ding, Ruizhou, et al. "Quantized deep neural networks for energy efficient hardware-based inference." 2018 23rd Asia and South Pacific Design Automation Conference (ASP-DAC). IEEE, 2018: 1-8 (Year: 2018).*

Anderson, Jeff, et al. "Photonic processor for fully discretized neural networks." 2019 IEEE 30th International Conference on Application-specific Systems, Architectures and Processors (ASAP). vol. 2160. IEEE, Jul. 2019: 25-34 (Year: 2019).*

Bunandar, Darius, et al. "Programmable nanophotonics for computation." 2018 IEEE 15th International Conference on Group IV Photonics (GFP). IEEE, 2018. (Year: 2018).*

Nahmias, Mitchell A., et al. "Photonic multiply-accumulate operations for neural networks." IEEE Journal of Selected Topics in Quantum Electronics 26.1 (Sep. 18, 2019): 1-18. (Year: 2019).*

Miscuglio, Mario, and Volker J. Sorger. "Photonic tensor cores for machine learning." arXiv preprint arXiv:2002.03780 (Jun. 2020). (Year: 2020).*

Shiflett, Kyle, et al. "Pixel: Photonic neural network accelerator." 2020 IEEE International Symposium on High Performance Computer Architecture (HPCA). IEEE, Feb. 2020. (Year: 2020).*

International Search Report and Written Opinion mailed Dec. 30, 2020 in connection with International Application No. PCT/US2020/051965.

* cited by examiner

QUANTIZED INPUTS FOR MACHINE LEARNING MODELS

RELATED APPLICATIONS

This application claims priority under 35 U.S.C. § 119(e) to U.S. Provisional Application 62/904,230 entitled, "Quantized Inputs to Neural Networks for Image Recognition," filed Sep. 23, 2019, the entire contents of which is incorporated by reference herein.

BACKGROUND

Deep learning, machine learning, latent-variable models, neural networks and other matrix-based differentiable programs are used to solve a variety of problems, including natural language processing and object recognition in images. Solving these problems with deep neural networks typically requires long processing times to perform the required computation. Some conventional approaches to speed up deep learning algorithms include developing specialized hardware architectures. Conventional computer processors, e.g., central processing units (CPUs) include circuits having hundreds of millions of transistors, which are used to implement logical gates on bits of information represented by electrical signals. Such hardware architectures are designed for general purpose computing and are not optimized for the particular patterns of data movement and computation required by algorithms typically employed in deep learning and other matrix-based differentiable programs. One conventional example of specialized hardware for use in implementing deep learning algorithms are graphics processing units (GPUs) having a highly parallel architecture that makes them more efficient than CPUs for performing image processing, graphical manipulations, and other parallelizable algorithms, such as those used in neural networks and deep learning.

Deep learning using neural networks conventionally requires two stages: a training stage and an evaluation stage (sometimes referred to as "inference"). Before a deep learning algorithm can be meaningfully executed on a processor, e.g., to classify an image or speech sample, during the evaluation stage, the neural network must first be trained.

SUMMARY

Some embodiments are directed to a method of pre-processing first data for use with a trained machine learning model, the method comprising: accessing the first data, wherein the first data has a first precision; generating, based on at least a first portion of the first data, second data having a second precision lower than the first precision; and providing the second data as input to the trained machine learning model to generate model output.

In some embodiments, the first precision may comprise a first number of bits, and the second precision comprises a second number of bits, wherein the second number of bits is lower than the first number of bits.

In some embodiments, the trained machine learning model may be trained using training data having a same precision as the first precision.

In some embodiments, the at least the first portion of the first data may comprise all of the first data.

In some embodiments, the method may further comprise scaling and/or normalizing the second data.

In some embodiments, generating the second data may be performed as part of an analog to digital conversion of the at least the first portion of the first data.

In some embodiments, the second number of bits may be less than 65% of the first number of bits, and an accuracy of the trained machine learning model using the second data may be at least 95% of an accuracy of the trained machine learning model using data having a same precision as the first precision.

In some embodiments, generating the second data may comprise performing a bit shifting operation on the at least the first portion of the first data.

In some embodiments, generating the second data may comprise performing a bit rounding operation on the at least the first portion of the first data.

In some embodiments, the method may further comprise generating, based on a second portion of the first data, third data having a third precision lower than the first precision, wherein the third precision is different than the second precision.

In some embodiments, the first data may comprise image data, wherein generating the second data comprises reducing a precision of a value for a first pixel of the image data, and wherein generating the third data comprises reducing a precision of a value for a second pixel of the image data.

In some embodiments, the first data may comprise image data, and generating the second data may comprise reducing a precision of a value for a first channel of the image data, and generating the third data may comprise reducing a precision of a value for a second channel of the image data.

In some embodiments, the first data may comprise image data.

In some embodiments, the first data may comprise multi-dimensional data.

In some embodiments, the first data may comprise time series data.

In some embodiments, the method may further comprise: accessing the first data comprises reading a value from an image file; and generating the second data comprises right-shifting, by a number of bits, the read value to produce a reduced-bit value.

In some embodiments, scaling and/or normalizing the first portion of the first data may comprise: scaling the reduced-bit value to a within a range of 0 to 1; and normalizing the scaled reduced-bit value according to a dataset mean and standard deviation.

In some embodiments, the method may further comprise sending the generated second data from a host device to an accelerator device.

In some embodiments, the accelerator device may comprise a photonic processor.

Some embodiments are directed to a method for using a trained machine learning model with reduced-precision input, the method comprising: accessing reduced-precision data having a precision less than a precision of training data used to train the trained machine learning model; providing the reduced-precision data as input to the trained machine learning model to generate model output; and using the model output to determine at least one characteristic of the reduced-precision data.

In some embodiments, the method further comprises scaling and/or normalizing the reduced-precision data.

Some embodiments are directed to a method of pre-processing first image data for use with a trained machine learning model, the method comprising: accessing the first image data, wherein the first image data has a first precision; generating, based on at least a first portion of the first image data, second image data having a second precision lower than the first precision; and providing the second image data as input to the trained machine learning model to generate model output.

Some embodiments are directed to a method for using a trained machine learning model with reduced-precision input, the method comprising: accessing one or more reduced-precision images having a precision less than a precision of training images used to train the trained machine learning model; providing the one or more reduced-precision images as input to the trained machine learning model to generate model output; and using the model output to determine at least one characteristic of the reduced-precision images.

In some embodiments, accessing the one or more reduced-precision images may comprise reading at least one value from an image file.

In some embodiments, the method may further comprise scaling and/or normalizing the one or more reduced-precision images prior to providing the one or more reduced-precision images as input to the trained machine learning model.

In some embodiments, normalizing the one or more reduced-precision images may comprises: normalizing the one or more reduced-precision images according to a dataset mean and standard deviation.

The foregoing summary is provided by way of illustration and is not intended to be limiting. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

DETAILED DESCRIPTION

Figure 1:
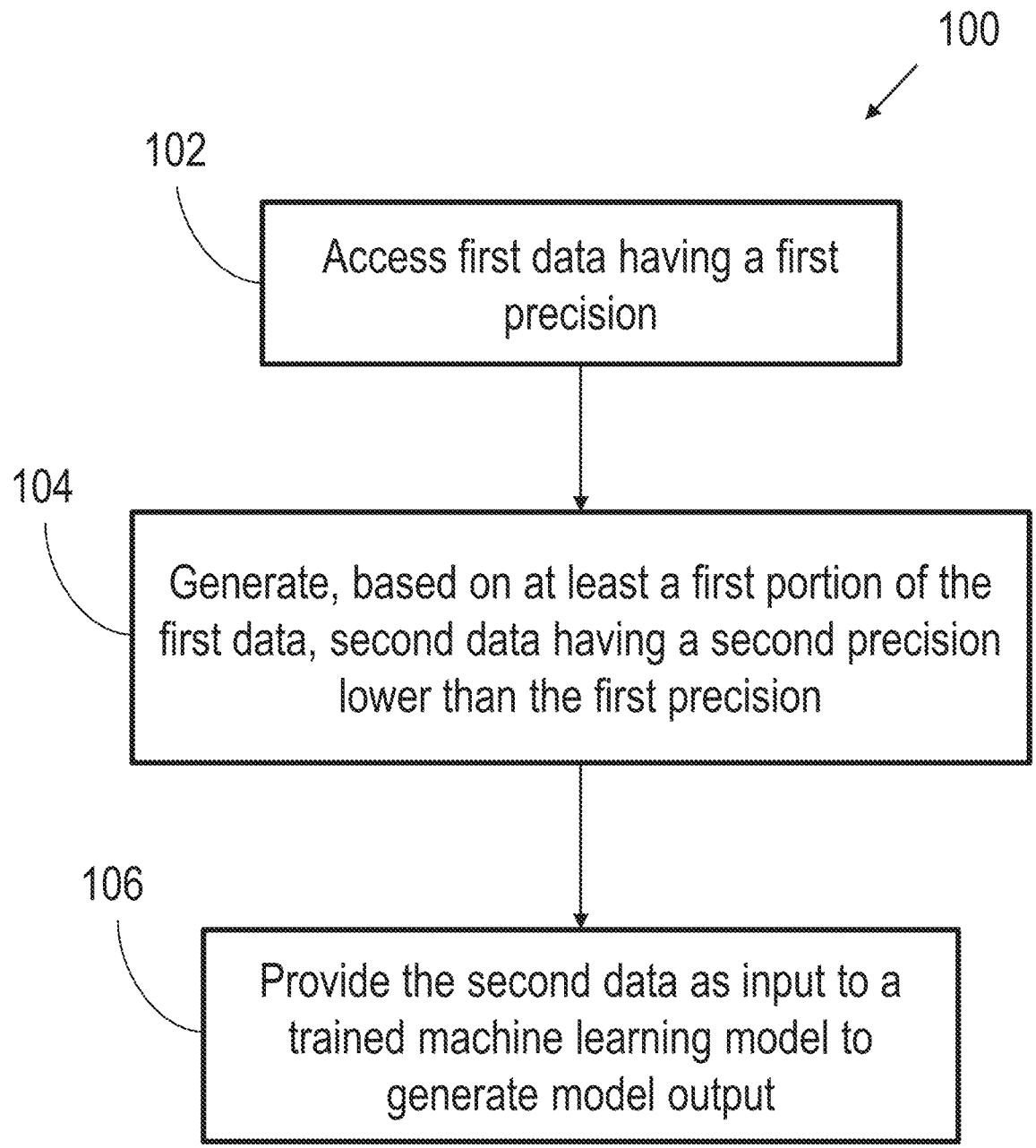
FIG. 1 depicts an illustrative method for pre-processing first data for use with a trained machine learning model, in accordance with some embodiments of the technology described herein.

The inventors have recognized and appreciated that for many applications of neural networks, efficiency is of paramount importance. For example, it may be important for neural network inference to be performed efficiently in the context of applications requiring high-speed computation, such as high frequency stock trading, real-time speech processing, or any other application relying on a neural network model. As recognized and appreciated by the inventors, in some instances it may be desirable to increase the efficiency of a neural network model even if doing so results in a loss of model accuracy. For example, there may be a degree of accuracy loss which is considered acceptable (e.g., within 1%, 5%, or 10% of an original accuracy) to achieve a corresponding increase in model efficiency.

Model quantization is a technique for improving the efficiency of a neural network by reducing the precision at which calculations for using and/or training the neural network are performed. The inventors have recognized and appreciated that with some conventional techniques for model quantization, the reduction of precision is typically performed on floating point values (e.g., 32-bit floating point values) that are either weights or intermediate activations for the neural network model. For example, in the context of image processing using neural networks, the input data may typically comprise floating point values that are the result of scaling and normalizing pixel values from an input image.

Some embodiments relate to novel techniques for performing neural network inference at a reduced precision in order to improve model efficiency. For example, according to the techniques described herein, a neural network model may be trained using data having a precision that is higher than that of the data used to perform inference following training of the model. According to some embodiments, the inventors herein have recognized that it may be advantageous to use reduced-precision input data for a neural network at the inference stage. For example, the input data may be collected at a reduced precision, or the precision of the input data may be reduced prior to performing other pre-processing on the input data (e.g., as part of an analog to digital conversion of the data). For example, in the context of image processing, the original image data (e.g., as obtained from a camera or other image-capturing device) may comprise RGB (or RBG) pixel values that are unsigned 8-bit integers ranging from 0-255. Thus, as recognized and appreciated by the inventors, even though the inputs to a neural network for image processing may ultimately be stored as floating point values that have been scaled and normalized, they can nevertheless be quantized to one of 256 unique values without any loss of information. As such, according to some embodiments of the technology described herein, the inventors have developed techniques for reducing the number of bits read from an image before performing scaling and normalization steps to reduce an amount of memory bandwidth required to read input data into a model. Although examples are described herein with respect to image processing, it should be appreciated that the techniques developed by the inventors may be applied in other domains, such as audio processing (e.g., speech-to-text, language detection, etc., in which input data may comprise time series data), natural language processing (e.g., parsing, automated translation, etc., in which input text may comprise characters represented with binary), or any other type of processing using a neural network.

As described below with respect to FIGS. 5A-5B and 6A-6B, the techniques developed by the inventors provide substantial improvements in efficiency over conventional techniques, without significantly reducing the accuracy of the output of the neural network models. By reducing the precision of data provided as input to the neural network models, the amount of data processed during inference may be reduced. This may be especially advantageous in the context of hardware acceleration, since reducing the precision of the input data reduces the amount of data passed between the host device (e.g., the CPU) and the accelerator device (e.g., a GPU, or a photonic processor as described herein at least with respect to FIG. 7).

Following below are more detailed descriptions of various concepts related to, and embodiments of, the input quantization techniques developed by the inventors. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 depicts a method 100 for pre-processing first data for use with a trained machine learning model. As described herein, the method 100 comprises reducing the precision of the first data, and providing the reduced-precision data as input to the trained machine learning model to generate model output. In some embodiments, the method 100 may be carried out on a computing device (e.g., as described herein at least with respect to FIG. 8). For example, the computing device may include at least one processor, and at least one non-transitory storage medium storing processor-executable instructions which, when executed, perform the acts of method 100.

At act 102, the method 100 begins by accessing first data having a first precision. The first data may be accessed in any suitable manner. For example, the first data may be accessed from a storage medium (e.g., at least one non-transitory storage medium). In the context of image processing, for example, the first data may be stored as an image file, such that accessing the first data may comprise reading one or more values from an image file. According to some embodiments, the first data may be accessed directly from a sensor, a camera, or any other suitable device configured to capture data. For example, the first data may be image data captured using a camera, or an audio signal captured using a microphone. In some embodiments, the first data may be received from an external source (e.g., cloud storage, a database, or any other suitable remote storage medium) via a wired or wireless (e.g., network/internet) connection.

In some embodiments, the first data may be stored or received in a compressed form (e.g., to save memory or communication bandwidth). For example, image data may be compressed into a JPEG or a PNG format, and video data may be compressed into a HEVC or a H.264 format. According to some embodiments, compressed data may require pre-processing before it can be used. For example, JPEG images may need to be decoded using a Huffman table lookup and transformed into the spatial (height and width) domain using a discrete-cosine transform.

In some embodiments, the first data may be image data. As described herein, image data may comprise a plurality of pixel values (e.g., RGB values, CMYK values, intensity values, signed or unsigned integer values, binary values, or any other suitable pixel values). In some embodiments, the image data may be RGB image data comprising a plurality of 8-bit pixel values in each of three color channels (e.g., red, green, and blue). According to some embodiments, the first data may comprise multi-dimensional data (e.g., data represented in a matrix format, such as a two-dimensional image, or multi-channel image data having two or more dimensions). In some embodiments, the first data may be time series data. For example, the time series data may represent an audio signal, climate data, financial data (e.g., trading data), or any other suitable type of data. The time series data may include one or more amplitudes (e.g., for an audio signal), or any other suitable representation of the time series data. The time series data may be represented with a plurality of values (e.g., signed or unsigned integers, binary values, etc.). In some embodiments, the first data may be another type of data, such as text data (e.g., represented as a sequence of characters), or any other suitable type of data. The data may be represented in binary or using integer or floating-point values. The data may be represented and/or stored in any suitable data structure or data structures, including, for example, a matrix, an array, a vector, or a list.

As described herein, the first precision of the first data may be measured according to any suitable metric of precision. For example, the first precision of the first data may be measured in a number of bits, which is also referred to herein as a bit width of the data. In the example of image data, the first precision may be 8 bits (e.g., representing a pixel value, which may be an unsigned integer), 16 bits, 32 bits, 64 bits, or any other suitable number of bits. According to some embodiments, the first precision may represent the precision at which the first data was collected (e.g., from a sensor, using a camera, or according to any other suitable data collection technique).

The method 100 proceeds with act 104, in which second data having a second precision lower than the first precision is generated based on at least a first portion of the first data. According to some embodiments, act 104 may be referred to herein as reducing the precision of the first data. As described herein, in some embodiments act 104 may be based on only a first portion of the first data. For example, act 104 may be applied only to some of the values representing the first data (e.g., in the example of image data, only some pixels or only certain channels of the image data). In some embodiments, act 104 may be based on all of the first data, such that act 104 may be applied to each of the values representing the first data. In some embodiments, act 104 may be repeated and/or performed in parallel for a second portion of the first data, in order to generate third data having a third precision, where the third precision is lower than the first precision. For example, the third precision may be different than the second precision, such that some of the first data is reduced to the second precision and some of the first data is reduced to the third precision. In the context of processing image data, for example, act 104 may comprise reducing pixel values associated with a first portion of the image data to the second precision, and reducing pixel values associated with a second portion of the image data to the third precision. Additionally or alternatively, act 104 may comprise reducing the value for a first channel of the image data to the second precision, and reducing the value for a second channel of the image data to the third precision.

In some embodiments, act 104 may be carried out as part of an analog to digital conversion of the first data. For example, the first data may comprise an analog signal which may be converted to a digital or binary form having a lower precision than the analog signal. In some embodiments, the analog to digital conversion may be implemented with hardware (e.g., an ADC) having a limited output precision, such that act 104 may be carried out without using software. In some embodiments act 104 may be carried out as part of pre-processing data from a compressed form into an uncompressed form. For example, for JPEG images, the Huffman decoding step can decode the data into 6 bits instead of the typical 8 bits.

In some embodiments, act 104 may comprise generating the second data by reducing a number of bits used to represent the first data. For example, the second data may be generated by truncating a number of bits used to represent the first data. The number of bits truncated at act 104 may be any suitable number of bits (e.g., 1 bit, 2 bits, 3 bits, 4 bits, 5 bits, 6 bits, 7 bits, 8 bits, 9 bits, 10 bits, or more than 10 bits, such as 16 bits, 32 bits, or any other suitable number of bits). According to some embodiments, truncating bits from the first data may be performed by performing a bit shifting operation on the first data (e.g., a right-shifting operation or a left-shifting operation). For example, in some embodiments, generating the second data may comprise right-shifting, by a number of bits, at least one value of the first data.

In some embodiments, the second data may be generated by rounding off a number of bits used to represent the first data. The number of bits rounded off at act 104 may be any suitable number of bits (e.g., 1 bit, 2 bits, 3 bits, 4 bits, 5 bits, 6 bits, 7 bits, 8 bits, 9 bits, 10 bits, or more than 10 bits, such as 16 bits, 32 bits, or any other suitable number of bits). The rounding performed at act 104 may include rounding up, rounding down, or any other suitable type of rounding. In some embodiments, reducing the number of bits used to represent the first data may comprise using any other mapping from a first number of bits (i.e., the first precision) to a second, lower number of bits (i.e., the second precision).

Regardless of how act 104 is carried out, the result may be second data having a second precision lower than the first precision. For example, as described herein above, the second data may be represented using fewer bits than the first data. In the example of image data, the second data may comprise second image data having pixel values represented with reduced precision. For example, if the first image data had pixel values represented with 8 bits, the second image data may have pixel values represented with 7 bits, 6 bits, 5 bits, 4 bits, 3 bits, 2 bits, or 1 bit.

At act 106, the method 100 continues with providing the second data as input to a trained machine learning model to generate model output. As described herein, act 106 may comprise using the trained machine learning model at an inference stage (e.g., to make a classification or prediction using the output of the machine learning model generated at act 106).

In some embodiments, the trained machine learning model may be a neural network model, and generating model output may comprise processing the second data using the neural network. In some embodiments, the neural network may comprise one or more convolutional layers, feed-forward layers, pooling layers, dropout layers, or any other suitable neural network layers. According to some embodiments, generating model output at act 106 may comprise passing the second data through the layers of the neural network. In some embodiments, the neural network may be an image processing neural network. For example, the neural network may be based on a ResNet, MobileNet, or VGG model. In some embodiments, the neural network may be a natural language processing (NLP) neural network, such as a sequence-based model.

According to some embodiments, the trained machine learning model may have been trained using data having a same precision as the first precision. For example, the machine learning model may have been trained using data having a precision of 8 bits, 16 bits, 32 bits, 64 bits, or any other suitable precision. In some embodiments, the machine learning model may have been trained using data represented as a single-precision or double-precision floating point value (e.g., which may have been scaled and/or normalized from an original integer or binary value). In the context of image processing, the machine learning model may have been trained using the ImageNet dataset at a corresponding original precision. As described below at least with respect to FIGS. 5A-5B and 6A-6B, a first accuracy of the machine learning model may be measured based on input data of the first precision, while a second accuracy of the machine learning model be measured based on input data of the second precision to quantify a reduction in accuracy on model output when reduced precision data is used.

In some embodiments, providing the second data as input to the trained machine learning model comprises processing the second data by scaling the second data. For example, the values representing the second data may be scaled to fall between 0 and 1. In the context of image processing, for example, this may be achieved by dividing each pixel value by an appropriate value (e.g., if the pixel values range from 0 to 255, then each value may be divided by 255). According to some embodiments, any other suitable technique for scaling the second data may be used (e.g., to scale values between −1 and 1, or within any other desired range).

In some embodiments, providing the second data as input to the trained machine learning model additionally or alternatively comprises processing the second data by normalizing the second data. For example, normalizing the second data may comprise subtracting a dataset mean from some or all of the values of the second data, and dividing each resulting value by the dataset standard deviation.

According to some embodiments, the method 100 further comprises sending the generated second data from a host device (e.g., a CPU) to an accelerator device (e.g., a photonic processor as described herein below at least with respect to FIG. 7). For example, as part of act 104, the reduced-precision data may be converted into a format processable by specialized computer hardware, such as a GPU, photonic processor, or any other suitable hardware. In some embodiments, the inference stage described with respect to act 106 may be carried out on the accelerator device. For example, one or more matrix multiplications or other operations relating to performing inference with the machine learning model may be carried out by the accelerator device at act 106.

Regardless of how the reduced-precision data is processed, the result of act 106 may be a generated machine learning model output. The model output may comprise a numeric value, according to some embodiments. The model output may represent information relating to the input data. For example, in the context of image processing, the model output may comprise or be based on one or more features extracted from the input image. In some embodiments, the model output may represent a prediction regarding the input data. For example, in the context of image processing, the model output may represent a predicted classification of the image or an object within the image. In some embodiments, the model output may include both a prediction and a probability associated with the prediction (e.g., a probability that the prediction is correct).

Figure 2:
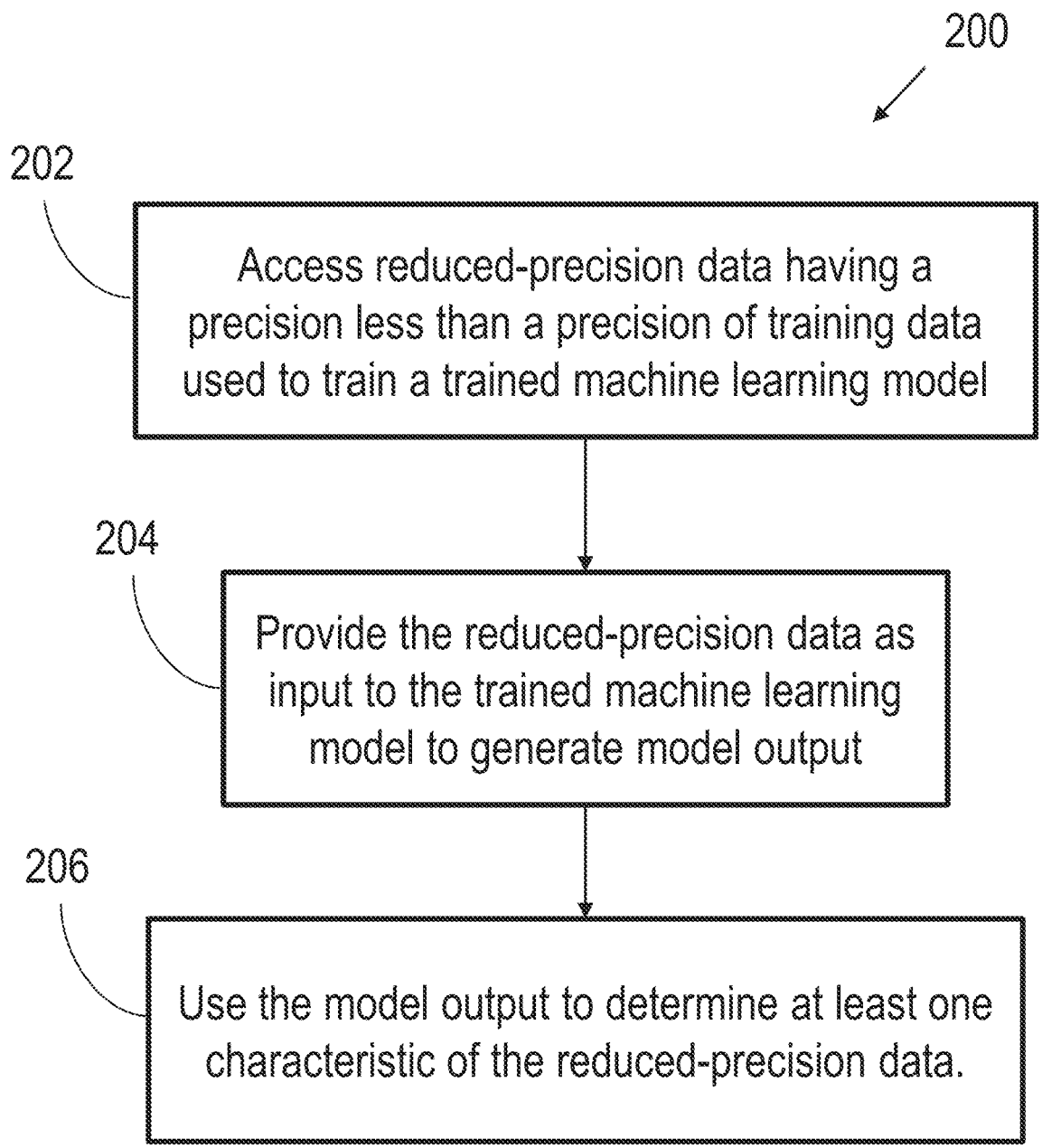
FIG. 2 depicts an illustrative method for using a trained machine learning model with reduced-precision input, in accordance with some embodiments of the technology described herein.

The inventors have recognized that in some circumstances reducing the precision of the input data prior to providing it to a trained machine learning model may not always be needed. For instance, data collected at a reduced precision relative to the precision of the data used to train a machine learning model may be provided as input to the trained machine learning model without a further reduction of the precision of the collected data. FIG. 2 depicts a method 200 for using a trained machine learning model with reduced-precision input (i.e., having a precision less than the precision of the data used to train the model). As described herein, the method 200 comprises accessing reduced-precision data, providing that data as input to the trained machine learning model, and using the model output to determine at least one characteristic of the reduced-precision data. In some embodiments, the method 200 may be carried out on a computing device (e.g., as described herein at least with respect to FIG. 8). For example, the computing device may include at least one processor, and at least one non-transitory storage medium storing processor-executable instructions which, when executed, perform the acts of method 200.

At act 202, the method 200 begins with accessing reduced-precision data having a precision less than a precision of training data used to train the trained machine learning model. The reduced-precision data may be accessed in any suitable manner. For example, the reduced-precision data may be accessed from a storage medium (e.g., at least one non-transitory storage medium). In the context of image processing, for example, the reduced-precision data may be stored as an image file, such that accessing the reduced-precision data comprises reading one or more values from an image file. According to some embodiments, the reduced-precision data may be accessed directly from a sensor, a camera, or any other suitable device for collecting data. For example, the reduced-precision data may be image data captured using a camera, or an audio signal captured using a microphone. In some embodiments, the reduced-precision data may be received from an external source (e.g., cloud storage, a database, or any other suitable remote storage medium) via a wired or wireless (e.g., network/internet) connection.

In some embodiments, the reduced-precision data may be stored or received in a compressed form (e.g., to save memory or communication bandwidth). For example, image data may be compressed into a JPEG or a PNG format, and video data may be compressed into a HEVC or a H.264 format. According to some embodiments, compressed data may require pre-processing before it can be used. For example, JPEG images may need to be decoded using a Huffman table lookup and transformed into the spatial (height and width) domain using a discrete-cosine transform.

As described herein above with respect to the first data of FIG. 1, the reduced-precision data may be image data. The image data may comprise a plurality of pixel values (e.g., RGB values, CMYK values, intensity values, signed or unsigned integer values, binary values, or any other suitable pixel values). In some embodiments, the image data may be RGB image data comprising a plurality of 8-bit pixel values in each of three color channels (e.g., red, green, and blue). According to some embodiments, the reduced-precision data may comprise multi-dimensional data (e.g., data represented in a matrix format, such as a two-dimensional image, or multi-channel image data having two or more dimensions). In some embodiments, the reduced-precision data may be time series data. For example, the time series data may represent an audio signal, climate data, financial data (e.g., trading data), or any other suitable type of data. The time series data may include one or more amplitudes (e.g., for an audio signal), or any other suitable representation of the time series data. The time series data may be represented with a plurality of values (e.g., signed or unsigned integers, binary values, etc.), according to some embodiments. In some embodiments, the reduced-precision data may be another type of data, such as text data (e.g., represented as a sequence of characters), or any other suitable type of data. The data may be represented in binary or using integer or floating-point values. The data may be represented and/or stored in any suitable data structure or data structures, including, for example, a matrix, an array, a vector, or a list.

As described herein, the precision of the reduced-precision data may be measured according to any suitable metric of precision. For example, the precision of the reduced-precision data may be measured in a number of bits, which is also referred to herein as a bit width of the data. In the example of image data, the precision of the reduced-precision data may be 8 or fewer bits (e.g., 7 bits, 6 bits, 5 bits, 4 bits, 3 bits, 2 bits, or 1 bit), 16 or fewer bits, 32 or fewer bits, or 64 or fewer bits, for example. According to some embodiments, the precision of the reduced-precision data may represent the precision at which the reduced-precision data was collected (e.g., from a sensor, using a camera, or according to any other suitable data collection technique).

As described above, the reduced-precision data accessed at act 202 may have a lower precision than that of training data used to train the trained machine learning model. For example, the machine learning model may have been trained using data having a precision of at least 8 bits, at least 16 bits, at least 32 bits, at least 64 bits, or any other suitable precision, while the reduced-precision data may have a corresponding precision of less than 8 bits, less than 16 bits, less than 32 bits, less than 64 bits, or any other suitable precision. In some embodiments, the machine learning model may have been trained using data represented as a single-precision or double-precision floating point value (e.g., which may have been scaled and/or normalized from an original integer or binary value). For example, in context of image processing, the training data may include pixel values represented as floating point values, generated based on original integer pixel values (which may be represented with 8 bits, 16 bits, etc. in binary). In this example, the corresponding reduced precision data may be represented using 7 bits, 6 bits, 5 bits, 4 bits, 3 bits, 2 bits, or 1 bit.

At act 204, the method 200 continues with providing the reduced-precision data as input to the trained machine learning model to generate model output. Act 204 may comprise using the trained machine learning model at an inference stage (e.g., to make a classification or prediction using the output of the machine learning model, as described herein at least with respect to act 206).

In some embodiments, the trained machine learning model may be a neural network model, and generating model output may comprise processing the reduced-precision using the neural network. In some embodiments, the neural network may comprise one or more convolutional layers, feed-forward layers, pooling layers, dropout layers, or any other suitable neural network layers. According to some embodiments, generating model output at act 204 may comprise passing the second data through the layers of the neural network. In some embodiments, the neural network may be an image processing neural network. For example, the neural network may be based on a ResNet, MobileNet, or VGG model. In some embodiments, the neural network may be a natural language processing (NLP) neural network, such as a sequence-based model. As described below at least with respect to FIGS. 5A-5B and 6A-6B, an original accuracy of the machine learning model may be measured based on input data having the same precision as the data used to train the machine learning model, while a reduced-precision accuracy of the machine learning model be based input data having a same precision as the reduced-precision data.

In some embodiments, providing the reduced-precision data as input to the trained machine learning model additionally comprises processing the second data by scaling the reduced-precision data. For example, the values representing the reduced-precision data may be scaled to fall between 0 and 1. In the context of image processing, for example, this may be achieved by dividing each pixel value by an appropriate value (e.g., if the pixel values range from 0 to 255, then each value may be divided by 255). According to some embodiments, any other suitable technique for scaling the reduced-precision data may be used (e.g., to scale values between −1 and 1, or within any other desired range).

In some embodiments, providing the reduced-precision data as input to the trained machine learning model additionally or alternatively comprises processing the reduced-precision data by normalizing the reduced-precision data. For example, normalizing the reduced-precision data may comprise subtracting a dataset mean from some or all of the values of the reduced-precision data, and dividing each resulting value by the dataset standard deviation.

Regardless of how the reduced-precision data is processed, the result of act 204 may be a generated machine learning model output. The model output may comprise a numeric value, according to some embodiments. The model output may represent information relating to the input data. For example, in the context of image processing, the model output may comprise or be based on one or more features extracted from the input image. In some embodiments, the model output may represent a prediction regarding the input data. For example, in the context of image processing, the model output may represent a predicted classification of the image or an object within the image.

At act 206, the method 200 may continue with using the model output to determine at least one characteristic of the reduced-precision data. For example, in the context of processing an image, the determined characteristic may comprise a classification of the image or a classification of one or more objects in the image; an identification of one or more objects, animals, people, obstacles, etc., in an image; a segmentation of the image (e.g., a bounding box or cropped version of the image); a labelling of the image (e.g., with a caption, class, or other suitable label); or any other suitable characteristic. In the context of natural language processing (NLP), the characteristic may be a detected language of the reduced-precision data; a translation of the reduced precision data from one language to another language; a parse-tree of the reduced precision data; or any other suitable characteristic. In the context of audio processing, the characteristic may be text representing words associated with the reduced-precision audio data (e.g., for speech-to-text applications). Any other suitable type of characteristic may be determined at act 206, according to some embodiments.

According to some embodiments, the method 200 further comprises sending the generated second data from a host device (e.g., a CPU) to an accelerator device (e.g., a photonic processor as described herein below at least with respect to FIG. 7). For example, as part of act 204 and/or 206, the reduced-precision data may be converted into a format processable by specialized computer hardware, such as a GPU, photonic processor, or any other suitable hardware. In some embodiments, the inference stage described with respect to act 204 and/or 206 may be carried out on the accelerator device. For example, one or more matrix multiplications or other operations relating to performing inference with the machine learning model may be carried out by the accelerator device at act 204 and/or 206.

Figure 3:
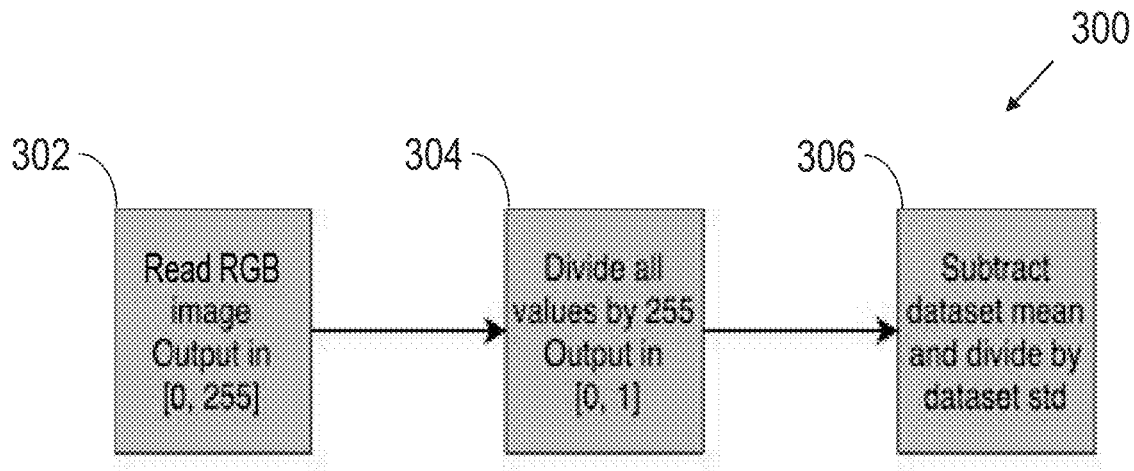
FIG. 3 depicts an illustrative method for pre-processing image data for use with a trained machine learning model.

FIG. 3 depicts a method 300 for pre-processing image data for use with a trained machine learning model. As shown, the method 300 begins at act 302 with reading an RGB image. Each read value of the RGB image comprises a value between 0 and 255 (i.e., an integer represented with 8 bits). At act 304, the method 300 continues with dividing each of the read values by 255. This results in the read values being scaled such that they fall between 0 and 1. At act 306, the method 300 continues with subtracting a dataset mean from the each of the scaled values, and then dividing by the dataset standard deviation. This results in the read values being normalized, such that the image data is ready for processing by a machine learning model (e.g., such as an image processing model, such as ResNet, MobileNet, or VGG models.

Figure 4:
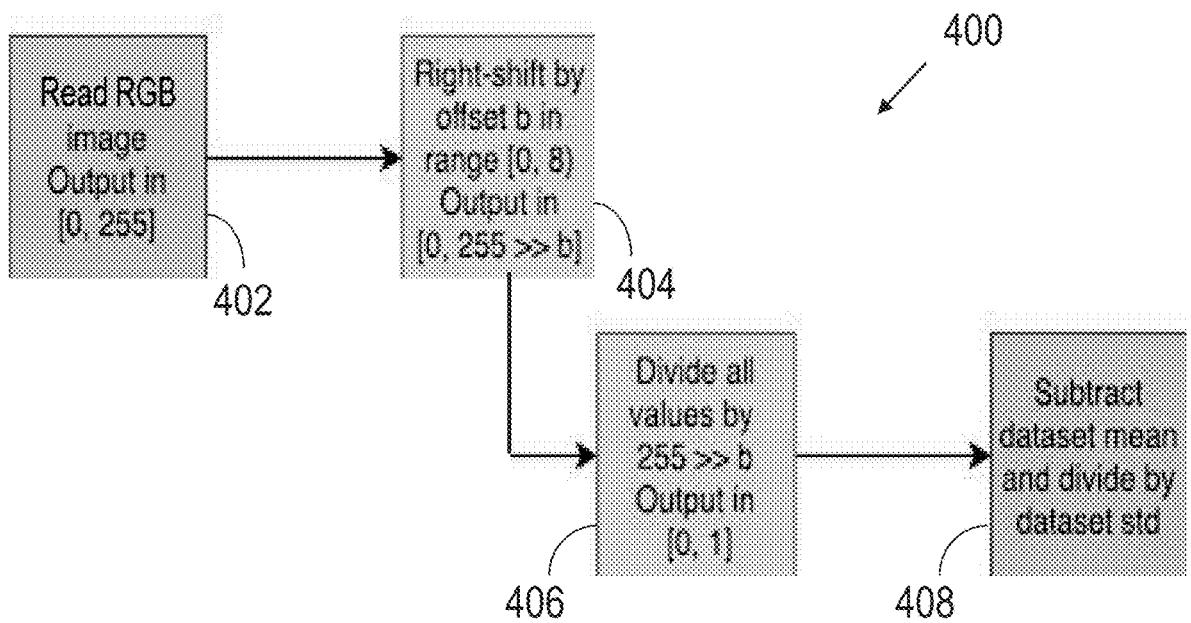
FIG. 4 depicts an illustrative method for pre-processing image data for use with a trained machine learning model, in accordance with some embodiments of the technology described herein.

FIG. 4 depicts a method 400 for pre-processing image data for use with a trained machine learning model in accordance with some embodiments. The method 400, as shown, is an exemplary implementation of acts 102 and 104 of method 100, as described herein with respect to FIG. 1.

At act 402, the method 400 may begin with reading an RGB image. As described herein at least with respect to FIG. 1, reading an RGB image may comprise accessing an image file, or accessing the RGB image data in any other suitable manner. Regardless of how the RGB image data is accessed, the values read at act 402 may comprise values between 0 and 255 (e.g., an unsigned integer represented with 8 bits), which may represent pixel values of each color channel (red, green, or blue) of the RGB image.

At act 404, the read values from act 402 may be right-shifted by an offset b. As described herein at least with respect to FIG. 1, right-shifting the pixel values may serve to truncate the pixel values by reducing their bit width. In particular, right-shifting by offset b serves to truncate the rightmost b bits from each pixel value. As shown in the figure, the offset b may be within the range 0 to 8, not including 8. Since the pixel values read at act 402 are represented with 8 bits, in this example, this ensures that the truncation operation of act 404 does not truncate all the bits representing the RGB image. As shown, the result of act 404 may be an output in the range 0 to 255, right-shifted by offset b. For example, if b=3, then the output of act 404 would be in the range 0 to 255>>3=31.

At act 406, the right-shifted values generated at act 404 may be divided by the value 255 right-shifted by the offset b. This may serve to scale the right-shifted values to within the range 0 to 1. For example, if b=3, then the right-shifted values would be divided 255>>3=31 in order to scale the values within the range 0 to 1.

At act 408, the scaled values generated at act 406 may be normalized. For example, as shown, a dataset mean (e.g., an average across the pixel values of the RGB image, or one or more RGB images) may be subtracted from each of the scaled values, and the result may be divided by a dataset standard deviation (e.g., a standard deviation computed across the pixel values of the RGB image, or one or more RGB images).

Regardless of how the RGB image data is processed during acts 402 to 408, the result may be pre-processed data suitable for use with a trained machine learning model (e.g., as described herein with respect to act 106 of method 100 and/or with respect to acts 204 and 206 of method 200). As shown, the data generated by the method 400 has a lower precision than the precision of the input RGB image data, due to the right-shifting operation performed on the data at acts 404 and 406.

As described below, the techniques developed by the inventors (e.g., as described herein at least with respect to FIGS. 1, 2, and 4) allow for pre-processing neural network inputs such that the precision of the input data is reduced, without resulting in a significant loss of model accuracy. FIGS. 5A-5B and 6A-6B show the accuracy of model output from a variety of neural network models when input having a reduced precision (i.e., a precision less than the precision of the data used to train the model) is provided to the model In particular, the neural network models of FIGS. 5A-5B and 6A-6B were trained using the ImageNet dataset, as shown and described above.

Figure 5A:
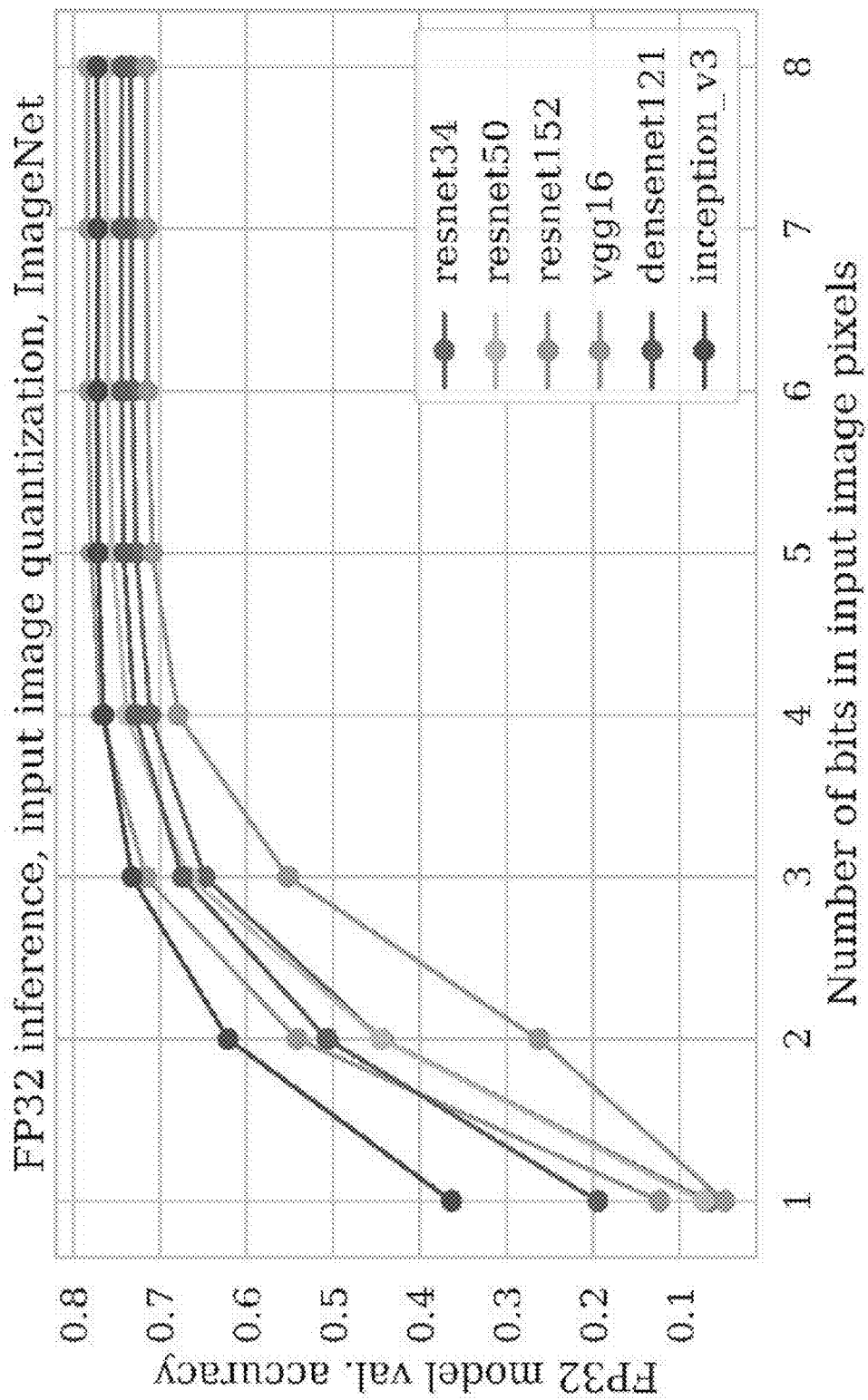
FIGS. 5A-5B depict illustrative top-1 accuracy results for a variety of neural networks, using the pre-processing techniques of FIG. 4, in accordance with some embodiments of the technology described herein.
Figure 5B:
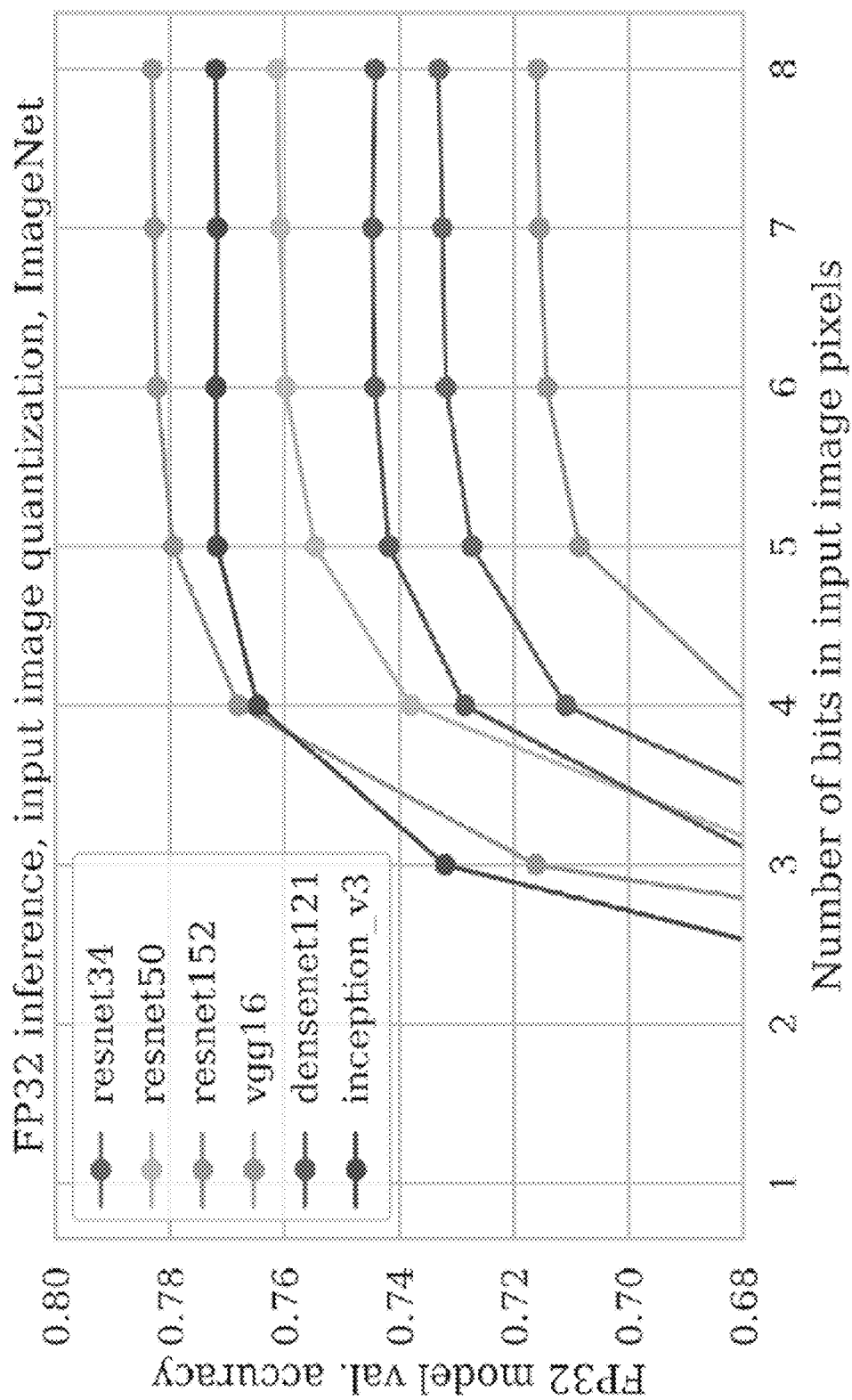

Referring to FIGS. 5A-5B, the illustrated plots depict top-1 accuracy results for a variety of neural network models, with inputs pre-processed according to the techniques of FIG. 4. The top-1 accuracy for a neural network model is the accuracy when only the exact expected result is considered "correct" for the purposes of calculating accuracy. For example, in the case of object recognition, if an image of a book is provided as input to the neural network model, then the output of the model is only considered a correct result when the model output is "book."

As shown, the vertical axis in FIGS. 5A and 5B represents the top-1 model accuracy, and the horizontal axis represents the number of bits remaining in the pixel values of the input images. As described herein at least with respect to FIG. 4, the number of bits used to represent the pixel values for the input images may be reduced by truncating the rightmost b bits from each pixel value, then scaling and/or normalizing the resulting values for processing by the neural network models. In the plots of FIGS. 5A and 5B, for example, the value 8 on the horizontal axis corresponds to truncating no bits from the pixel values, the value 7 corresponds to truncating 1 bit, the value 6 corresponds to truncating 2 bits, the value 5 corresponds to truncating 3 bits, etc.

As shown in FIGS. 5A-5B, pre-processing the input data according to the techniques described herein results in minimal loss of top-1 model accuracy relative to even a substantial reduction of input precision. For example, as shown in FIG. 5B, which depicts a zoomed-in view of the plot shown in FIG. 5A, retaining as few as 5 bits provides accuracy values within 0.02 of their original values (i.e., with full-precision 8-bit input data). With the neural network model "inception_v3", for example, the accuracy results when retaining as few as 4 bits are still within 0.02 of their original values. In general, the techniques described herein allow the precision of the input data for a neural network model to be reduced to 65% or less of its original precision, while maintaining an accuracy of at least 95% of an original accuracy of the trained machine learning model using full-precision data. For example, in the context of data represented with 8 bits, this may represent retaining five or fewer bits of the input data, while maintaining at least 95% of an original model accuracy.

According to some embodiments of the techniques described herein, the threshold below which precision is reduced may comprise less than 87.5% of an original precision; less than 75% of an original precision; less than 62.5% of an original precision; or less than 50% of an original precision. According to some embodiments of the techniques described herein, the threshold above which the accuracy is maintained may comprise at least 99% of an original accuracy; at least 98% of an original accuracy; at least 95% of an original accuracy; at least 90% of an original accuracy; at least 80% of an original accuracy; or at least 75% of an original accuracy.

Figure 6A:
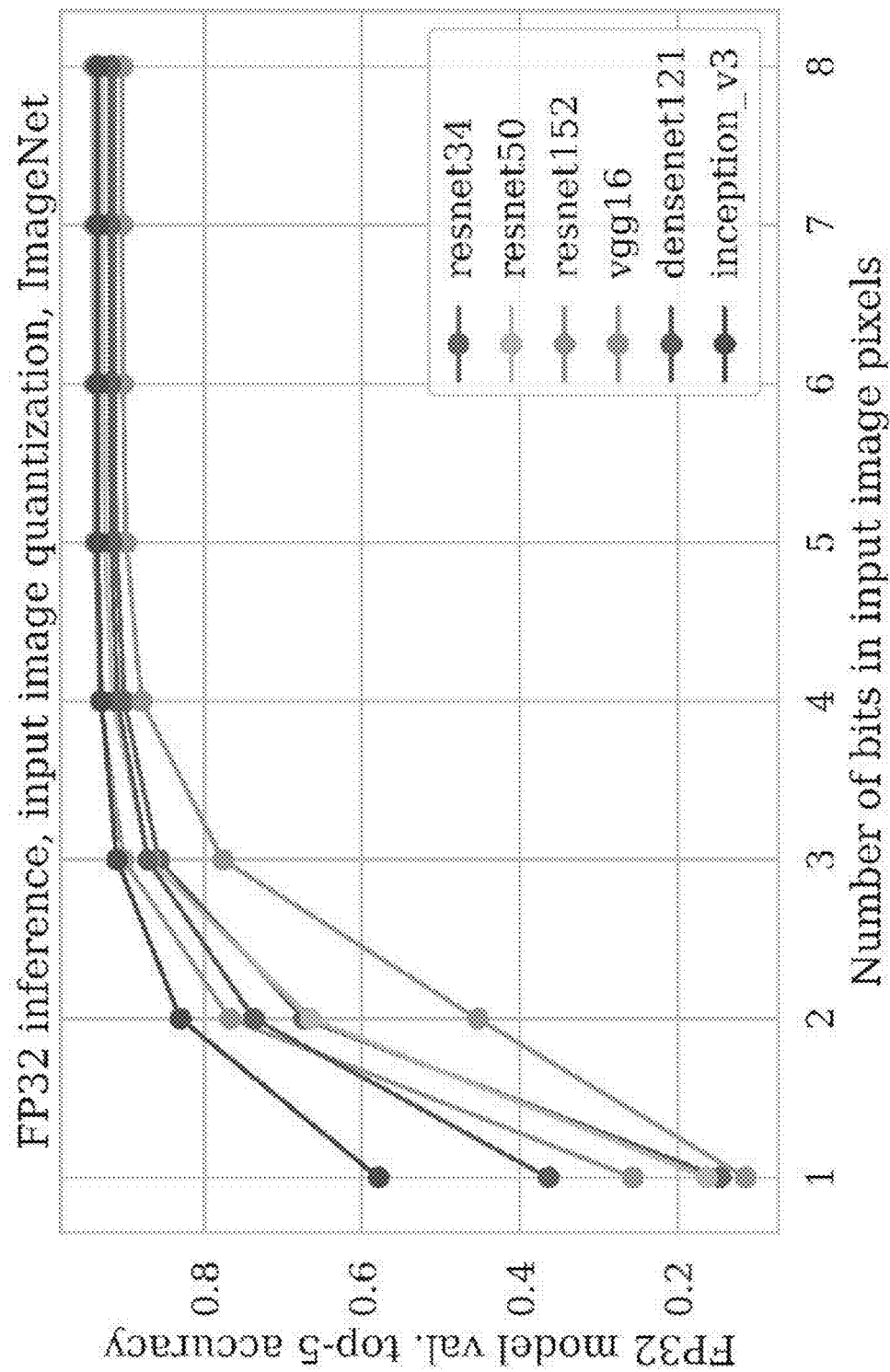
FIGS. 6A-6B depict illustrative top-5 accuracy results for a variety of neural networks, using the pre-processing techniques of FIG. 4, in accordance with some embodiments of the technology described herein.
Figure 6B:
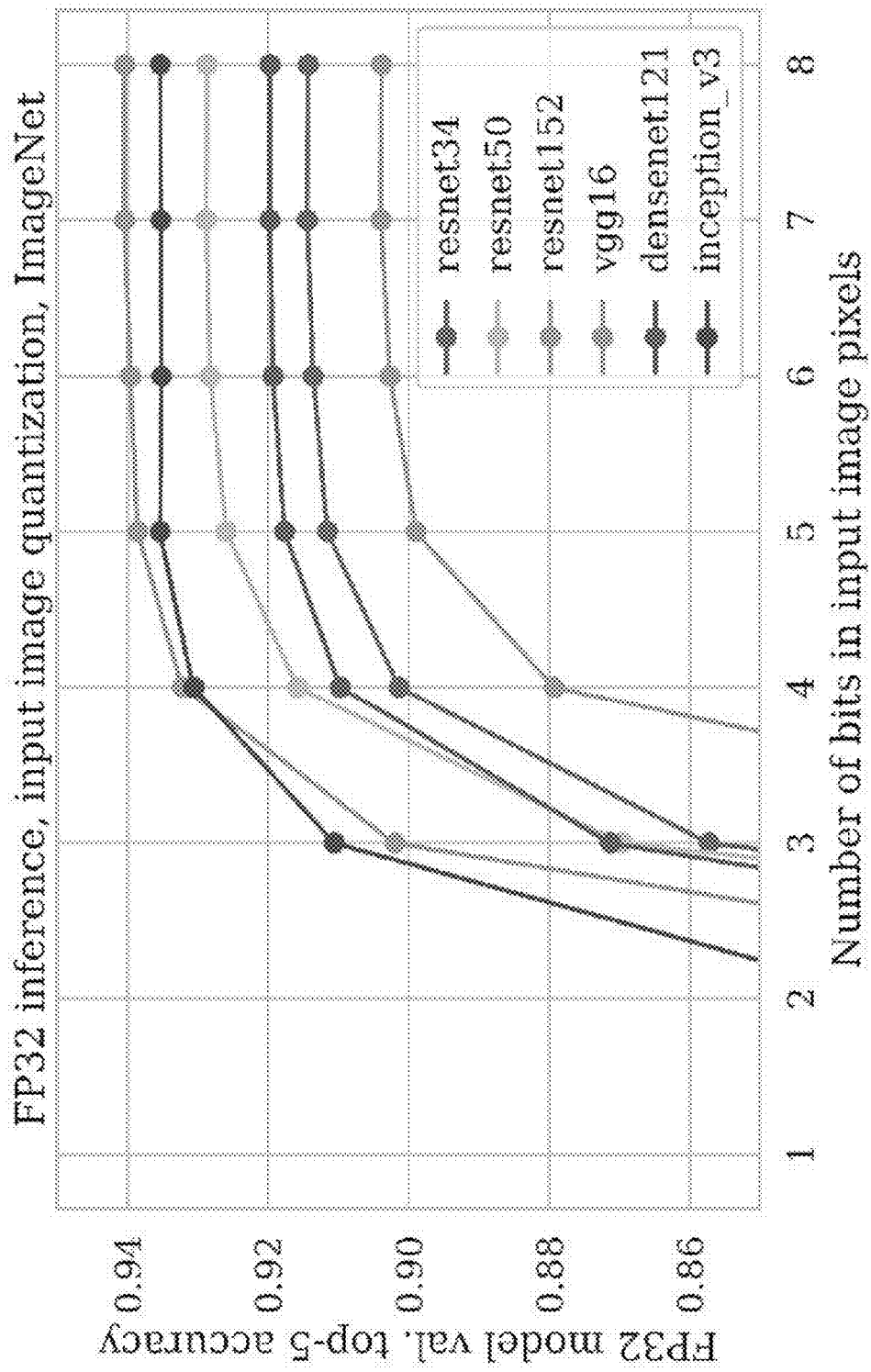

Referring to FIGS. 6A-6B, the illustrated plots depict top-5 accuracy results for a variety of neural network models, with inputs pre-processed according to one or more of the techniques described herein. The top-5 accuracy for a neural network model is the accuracy when the model output is considered "correct" for the purposes of calculating accuracy so as long as the expected result is within the top five results generated by the neural network model. For example, in the case of object recognition, if an image of a book is provided as input to the neural network model, then the output "box—0.7, book—0.6, shelf—0.25, paper—0.2, car—0.01," or any other results including "book" in the top five outputs would be considered correct.

As shown, the vertical axis in FIGS. 6A and 6B represents the top-5 model accuracy, and the horizontal axis represents the number of bits remaining in the pixel values of the input images. As described herein at least with respect to FIG. 4, the number of bits used to represent the pixel values for the input images may be reduced by truncating the rightmost b bits from each pixel value, then scaling and/or normalizing the resulting values for processing by the neural network models. In the plots of FIGS. 6A and 6B, for example, the value 8 on the horizontal axis corresponds to truncating no bits from the pixel values, the value 7 corresponds to truncating 1 bit, the value 6 corresponds to truncating 2 bits, the value 5 corresponds to truncating 3 bits, etc.

As shown in FIGS. 6A-6B, pre-processing the input data according to the techniques described herein results in minimal loss of top-5 model accuracy relative to even a substantial reduction of input precision. For example, as shown in FIG. 6B, which depicts a zoomed-in view of the plot shown in FIG. 6A, retaining as few as 5 bits provides accuracy values within 0.02 of their original values (i.e., with full-precision 8-bit input data). With the neural network models "resnet34", "resnet50", "resnet152", "densenet121", and "inception_v3", for example, the accuracy results when retaining as few as 4 bits are still within 0.02 of their original values. In general, the techniques developed by the inventors allow the precision of the input data for a neural network model to be reduced to 65% or less of its original precision, while maintaining an accuracy of at least 95% of an original accuracy of the trained machine learning model using full-precision data. For example, in the context of data represented with 8 bits, this may represent retaining five or fewer bits of the input data, while maintaining at least 95% of an original model accuracy.

According to some embodiments of the techniques described herein, the threshold below which precision is reduced may comprise less than 87.5% of an original precision; less than 75% of an original precision; less than 62.5% of an original precision; or less than 50% of an original precision. According to some embodiments of the techniques described herein, the threshold above which the accuracy is maintained may comprise at least 99% of an original accuracy; at least 98% of an original accuracy; at least 95% of an original accuracy; at least 90% of an original accuracy; at least 80% of an original accuracy; or at least 75% of an original accuracy.

Photonics-Based Processing

The inventors have recognized and appreciated that there are limitations to the speed and efficiency of conventional processors based on electrical circuits. Every wire and transistor in the circuits of an electrical processor has a resistance, an inductance, and a capacitance that cause propagation delay and power dissipation in any electrical signal. For example, connecting multiple processor cores and/or connecting a processor core to a memory uses a conductive trace with a non-zero impedance. Large values of impedance limit the maximum rate at which data can be transferred through the trace with a negligible bit error rate. In applications where time delay is crucial, such as high frequency stock trading, even a delay of a few hundredths of a second can make an algorithm unfeasible for use. For processing that requires billions of operations by billions of transistors, these delays add up to a significant loss of time. In addition to electrical circuits' inefficiencies in speed, the heat generated by the dissipation of energy caused by the impedance of the circuits is also a barrier in developing electrical processors.

The inventors further recognized and appreciated that using light signals, instead of electrical signals, overcomes many of the aforementioned problems with electrical computing. Light signals travel at the speed of light in the medium in which the light is traveling; thus the latency of photonic signals is far less of a limitation than electrical propagation delay. Additionally, no power is dissipated by increasing the distance traveled by the light signals, opening up new topologies and processor layouts that would not be feasible using electrical signals. Thus, light-based processors, such as a photonics-based processor may have better speed and efficiency performance than conventional electrical processors.

Additionally, the inventors have recognized and appreciated that a light-based processor, such as a photonics-based processor, may be well-suited for particular types of algorithms. For example, many machine learning algorithms, e.g. support vector machines, artificial neural networks, probabilistic graphical model learning, rely heavily on linear transformations on multi-dimensional arrays/tensors. The simplest example is multiplying vectors by matrices, which using conventional algorithms has a complexity on the order of $O(n2)$, where n is the dimensionality of the square matrices being multiplied. The inventors have recognized and appreciated that a photonics-based processor, which in some embodiment may be a highly parallel linear processor, can perform linear transformations, such as matrix multiplication, in a highly parallel manner by propagating a particular set of input light signals through a configurable array of beam splitters. Using such implementations, matrix multiplication of matrices with dimension n=512 can be completed in hundreds of picoseconds, as opposed to the tens to hundreds of nanoseconds using conventional processing. Using some embodiments, matrix multiplication is estimated to speed up by two orders of magnitude relative to conventional techniques. For example, a multiplication that may be performed by a state-of-the-art graphics processing unit (GPU) can be performed in about 10 ns can be performed by a photonic processing system according to some embodiments in about 200 ps.

To implement a photonics-based processor, the inventors have recognized and appreciated that the multiplication of an input vector by a matrix can be accomplished by propagating coherent light signals, e.g., laser pulses, through a first array of interconnected variable beam splitters (VBSs), a second array of interconnected variable beam splitters, and multiple controllable optical elements (e.g., electro-optical or optomechanical elements) between the two arrays that connect a single output of the first array to a single input of the second array.

Details of certain embodiments of a photonic processing system that includes a photonic processor are described below.

Figure 7:
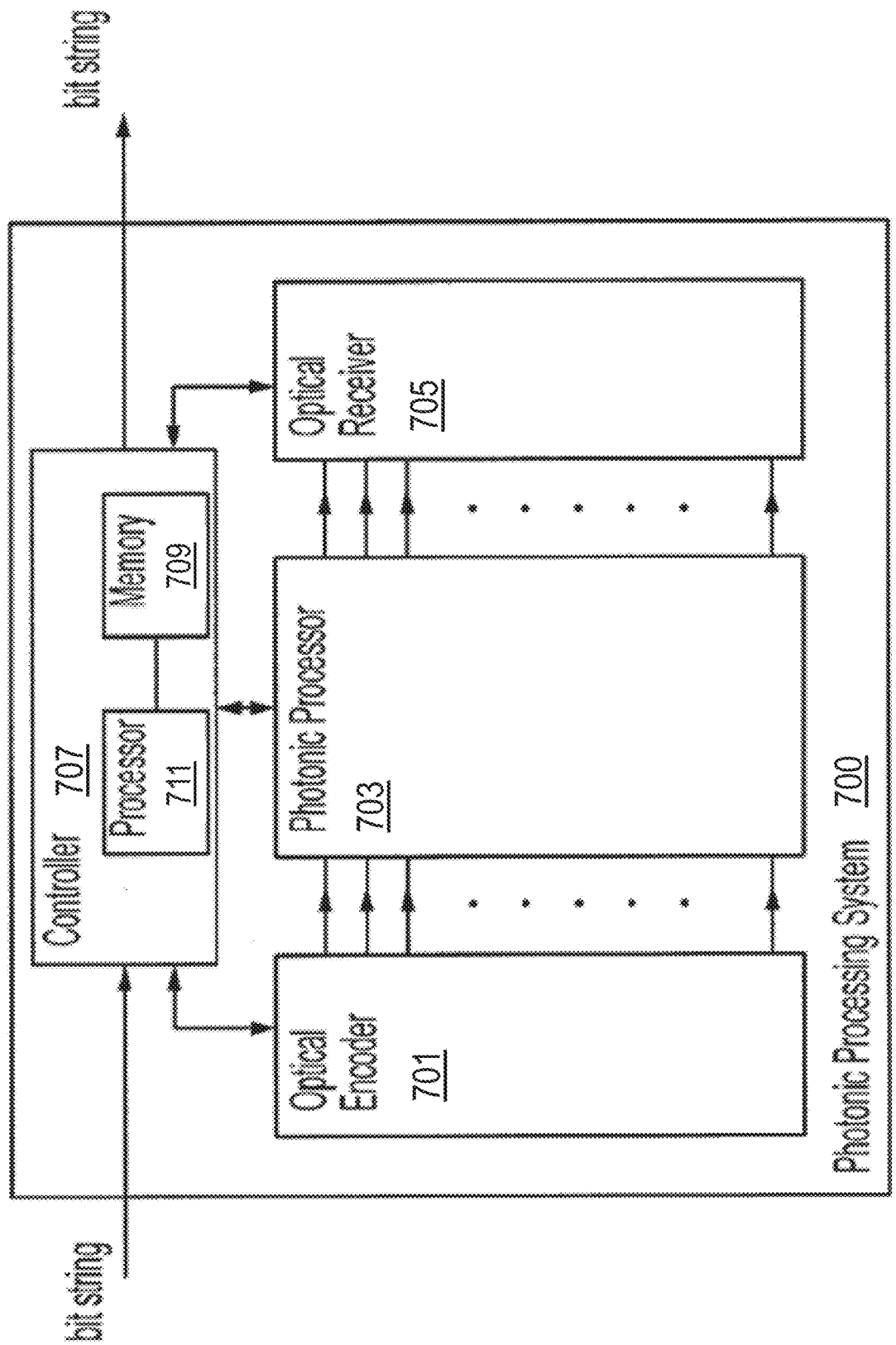
FIG. 7 is a schematic diagram of an illustrative photonic processing system on which some embodiments of the technology described herein may be employed.

Referring to FIG. 7, a photonic processing system 700 includes an optical encoder 701, a photonic processor 703, an optical receiver 705, and a controller 707, according to some embodiments. The photonic processing system 700 receives, as an input from an external processor (e.g., a CPU), an input vector represented by a group of input bit strings and produces an output vector represented by a group of output bit strings. For example, if the input vector is an n-dimensional vector, the input vector may be represented by n separate bit strings, each bit string representing a respective component of the vector. The input bit string may be received as an electrical or optical signal from the external processor and the output bit string may be transmitted as an electrical or optical signal to the external processor. In some embodiments, the controller 707 does not necessarily output an output bit string after every process iteration. Instead, the controller 707 may use one or more output bit strings to determine a new input bit stream to feed through the components of the photonic processing system 700. In some embodiments, the output bit string itself may be used as the input bit string for a subsequent iteration of the process implemented by the photonic processing system 700. In other embodiments, multiple output bit streams are combined in various ways to determine a subsequent input bit string. For example, one or more output bit strings may be summed together as part of the determination of the subsequent input bit string.

The optical encoder 701 is configured to convert the input bit strings into optically encoded information to be processed by the photonic processor 703. In some embodiments, each input bit string is transmitted to the optical encoder 701 by the controller 707 in the form of electrical signals. The optical encoder 701 converts each component of the input vector from its digital bit string into an optical signal. In some embodiments, the optical signal represents the value and sign of the associated bit string as an amplitude and a phase of an optical pulse. In some embodiments, the phase may be limited to a binary choice of either a zero phase shift or a $\pi$ phase shift, representing a positive and negative value, respectively. Embodiments are not limited to real input vector values. Complex vector components may be represented by, for example, using more than two phase values when encoding the optical signal. In some embodiments, the bit string is received by the optical encoder 701 as an optical signal (e.g., a digital optical signal) from the controller 707. In these embodiments, the optical encoder 701 converts the digital optical signal into an analog optical signal of the type described above.

The optical encoder 701 outputs n separate optical pulses that are transmitted to the photonic processor 703. Each output of the optical encoder 701 is coupled one-to-one to a single input of the photonic processor 703. In some embodiments, the optical encoder 701 may be disposed on the same substrate as the photonic processor 703 (e.g., the optical encoder 701 and the photonic processor 703 are on the same chip). In such embodiments, the optical signals may be transmitted from the optical encoder 701 to the photonic processor 703 in waveguides, such as silicon photonic waveguides. In other embodiments, the optical encoder 701 may be disposed on a separate substrate from the photonic processor 703. In such embodiments, the optical signals may be transmitted from the optical encoder 701 to the photonic processor 703 in optical fiber.

The photonic processor 703 performs the multiplication of the input vector by a matrix M. As described in detail below, the matrix M is decomposed into three matrices using a combination of a singular value decomposition (SVD) and a unitary matrix decomposition. In some embodiments, the unitary matrix decomposition is performed with operations similar to Givens rotations in QR decomposition. For example, an SVD in combination with a Householder decomposition may be used. The decomposition of the matrix M into three constituent parts may be performed by the controller 707 and each of the constituent parts may be implemented by a portion of the photonic processor 703. In some embodiments, the photonic processor 703 includes three parts: a first array of variable beam splitters (VBSs) configured to implement a transformation on the array of input optical pulses that is equivalent to a first matrix multiplication; a group of controllable optical elements configured to adjust the intensity and/or phase of each of the optical pulses received from the first array, the adjustment being equivalent to a second matrix multiplication by a diagonal matrix; and a second array of VBSs configured to implement a transformation on the optical pulses received from the group of controllable electro-optical element, the transformation being equivalent to a third matrix multiplication.

The photonic processor 703 outputs n separate optical pulses that are transmitted to the optical receiver 705. Each output of the photonic processor 703 is coupled one-to-one to a single input of the optical receiver 705. In some embodiments, the photonic processor 703 may be disposed on the same substrate as the optical receiver 705 (e.g., the photonic processor 703 and the optical receiver 705 are on the same chip). In such embodiments, the optical signals may be transmitted from the photonic processor 703 to the optical receiver 705 in silicon photonic waveguides. In other embodiments, the photonic processor 703 may be disposed on a separate substrate from the optical receiver 705. In such embodiments, the optical signals may be transmitted from the photonic processor 103 to the optical receiver 705 in optical fibers.

The optical receiver 705 receives the n optical pulses from the photonic processor 703. Each of the optical pulses is then converted to electrical signals. In some embodiments, the intensity and phase of each of the optical pulses is measured by optical detectors within the optical receiver. The electrical signals representing those measured values are then output to the controller 707.

The controller 707 includes a memory 709 and a processor 711 for controlling the optical encoder 701, the photonic processor 703 and the optical receiver 705. The memory 709 may be used to store input and output bit strings and measurement results from the optical receiver 705. The memory 709 also stores executable instructions that, when executed by the processor 711, control the optical encoder 701, perform the matrix decomposition algorithm, control the VBSs of the photonic processor 103, and control the optical receivers 705. The memory 709 may also include executable instructions that cause the processor 711 to determine a new input vector to send to the optical encoder based on a collection of one or more output vectors determined by the measurement performed by the optical receiver 705. In this way, the controller 707 can control an iterative process by which an input vector is multiplied by multiple matrices by adjusting the settings of the photonic processor 703 and feeding detection information from the optical receiver 705 back to the optical encoder 701. Thus, the output vector transmitted by the photonic processing system 700 to the external processor may be the result of multiple matrix multiplications, not simply a single matrix multiplication.

In some embodiments, a matrix may be too large to be encoded in the photonic processor using a single pass. In such situations, one portion of the large matrix may be encoded in the photonic processor and the multiplication process may be performed for that single portion of the large matrix. The results of that first operation may be stored in memory 709. Subsequently, a second portion of the large matrix may be encoded in the photonic processor and a second multiplication process may be performed. This "chunking" of the large matrix may continue until the multiplication process has been performed on all portions of the large matrix. The results of the multiple multiplication processes, which may be stored in memory 709, may then be combined to form the final result of the multiplication of the input vector by the large matrix.

In other embodiments, only collective behavior of the output vectors is used by the external processor. In such embodiments, only the collective result, such as the average or the maximum/minimum of multiple output vectors, is transmitted to the external processor.

Computer Implementation

Figure 8:
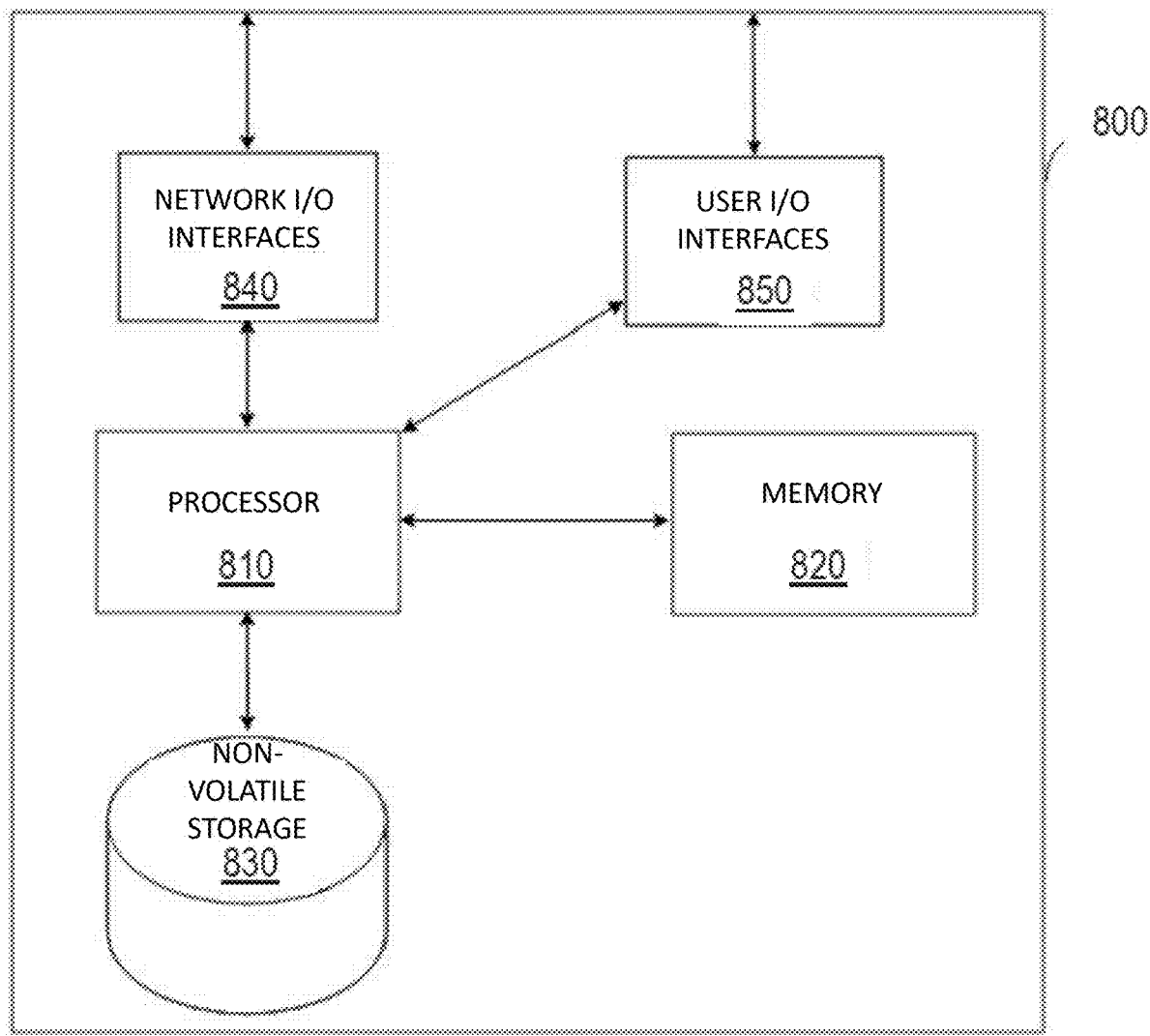
FIG. 8 depicts an illustrative implementation of a computer system that may be used in connection with some embodiments of the technology described herein.

An illustrative implementation of a computer system 800 that may be used in connection with any of the embodiments of the technology described herein is shown in FIG. 8. For example, the methods described with reference to FIGS. 1, 2, 3, and 4 may be implemented on and/or using computer system 800. The computer system 800 includes one or more processors 810 and one or more articles of manufacture that comprise non-transitory computer-readable storage media (e.g., memory 820 and one or more non-volatile storage media 830). The processor 810 may control writing data to and reading data from the memory 820 and the non-volatile storage device 830 in any suitable manner, as the aspects of the technology described herein are not limited in this respect. To perform any of the functionality described herein, the processor 810 may execute one or more processor-executable instructions stored in one or more non-transitory computer-readable storage media (e.g., the memory 820), which may serve as non-transitory computer-readable storage media storing processor-executable instructions for execution by the processor 810.

Computing device 800 may also include a network input/output (I/O) interface 840 via which the computing device may communicate with other computing devices (e.g., over a network), and may also include one or more user I/O interfaces 850, via which the computing device may provide output to and receive input from a user. The user I/O interfaces may include devices such as a keyboard, a mouse, a microphone, a display device (e.g., a monitor or touch screen), speakers, a camera, and/or various other types of I/O devices.

The above-described embodiments can be implemented in any of numerous ways. For example, the embodiments may be implemented using hardware, software or a combination thereof. When implemented in software, the software code can be executed on any suitable processor (e.g., a microprocessor) or collection of processors, whether provided in a single computing device or distributed among multiple computing devices. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments described herein comprises at least one computer-readable storage medium (e.g., RAM, ROM, EEPROM, flash memory or other memory technology, CD-ROM, digital versatile disks (DVD) or other optical disk storage, magnetic cassettes, magnetic tape, magnetic disk storage or other magnetic storage devices, or other tangible, non-transitory computer-readable storage medium) encoded with a computer program (i.e., a plurality of executable instructions) that, when executed on one or more processors, performs the above-discussed functions of one or more embodiments. The computer-readable medium may be transportable such that the program stored thereon can be loaded onto any computing device to implement aspects of the techniques discussed herein. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

The foregoing description of implementations provides illustration and description, but is not intended to be exhaustive or to limit the implementations to the precise form disclosed. Modifications and variations are possible in light of the above teachings or may be acquired from practice of the implementations. In other implementations the methods depicted in these figures may include fewer operations, different operations, differently ordered operations, and/or additional operations. Further, non-dependent blocks may be performed in parallel.

It will be apparent that example aspects, as described above, may be implemented in many different forms of software, firmware, and hardware in the implementations illustrated in the figures. Further, certain portions of the implementations may be implemented as a "module" that performs one or more functions. This module may include hardware, such as a processor, an application-specific integrated circuit (ASIC), or a field-programmable gate array (FPGA), or a combination of hardware and software.

What is claimed is:

1. A method of pre-processing first data for use with a trained machine learning model, the method comprising:
    accessing the first data, wherein the first data has a first precision represented by a floating-point value of at least 8 bits;
    generating, based on at least a first portion of the first data, second data having a second precision, represented by an integer value, lower than the first precision; and
    providing the second data as input to the trained machine learning model to generate model output, wherein:
        the trained machine learning model is trained using training data having a greater precision than the second precision;
        the trained machine learning model is implemented by a photonic processor; and
        providing the second data as input to the trained machine learning model comprises sending the second data from a host device to a second device having the photonic processor; and
    using the photonic processor to provide the model output based at least in part on the second data.

2. The method of claim 1, wherein the first precision comprises a first number of bits of at least 8 bits, and the second precision comprises a second number of bits, wherein the second number of bits is lower than the first number of bits.

3. The method of claim 1, wherein the trained machine learning model was trained using training data having a same precision as the first precision.

4. The method of claim 1, wherein the at least the first portion of the first data comprises all of the first data.

5. The method of claim 1, further comprising scaling and/or normalizing the second data.

6. The method of claim 1, wherein generating the second data is performed as part of an analog to digital conversion of the at least the first portion of the first data.

7. The method of claim 2, wherein the second number of bits is less than 65% of the first number of bits, and wherein an accuracy of the trained machine learning model using the second data is at least 95% of an accuracy of the trained machine learning model using data having a same precision as the first precision.

8. The method of claim 1, wherein generating the second data comprises performing a bit shifting operation on the at least the first portion of the first data.

9. The method of claim 1, further comprising:
    generating, based on a second portion of the first data, third data having a third precision lower than the first precision, wherein the third precision is different than the second precision.

10. The method of claim 9, wherein the first data comprises image data, wherein generating the second data comprises reducing a precision of a value for a first pixel of the image data, and wherein generating the third data comprises reducing a precision of a value for a second pixel of the image data.

11. The method of claim 9, wherein the first data comprises image data, and wherein generating the second data comprises reducing a precision of a value for a first channel of the image data, and wherein generating the third data comprises reducing a precision of a value for a second channel of the image data.

12. The method of claim 1, wherein the first data comprises image data.

13. The method of claim 1, wherein the first data comprises time series data.

14. The method of claim 5, wherein:
    accessing the first data comprises reading a value from an image file; and
    generating the second data comprises right-shifting, by a number of bits, the read value to produce a reduced-bit value.

15. The method of claim 14, wherein scaling and/or normalizing the first portion of the first data comprises:
    scaling the reduced-bit value to a within a range of 0 to 1; and
    normalizing the scaled reduced-bit value according to a dataset mean and standard deviation.

16. A method for using a trained machine learning model with reduced-precision input, the method comprising:
    accessing reduced-precision data having a precision, represented by an integer value, less than a precision of training data used to train the trained machine learning model, wherein the precision of training data is a floating-point value of at least 8 bits;

providing the reduced-precision data as input to the trained machine learning model to generate model output, wherein the trained machine learning model is implemented by a photonic processor and providing the reduced-precision data as input to the trained machine learning model comprises sending the reduced-precision data from a host device to a second device having the photonic processor; and using the model output to determine at least one characteristic of the reduced-precision data.

17. The method of claim 16, further comprising scaling and/or normalizing the reduced-precision data.

18. A method of pre-processing first image data for use with a trained machine learning model, the method comprising:

accessing the first image data, wherein the first image data has a first precision represented by a floating-point value of at least 8 bits;

generating, based on at least a first portion of the first image data, second image data having a second precision, represented by an integer value, lower than the first precision; and providing the second image data as input to the trained machine learning model to generate model output, wherein:

the trained machine learning model is trained using training data having a greater precision than the second precision;

the trained machine learning model is implemented by a photonic processor; and providing the second image data as input to the trained machine learning model comprises sending the second image data from a host device to a second device having the photonic processor; and using the photonic processor to provide the model output based on the second image data.

* * * * *